F. R. WILLSON, Sr.
Whiffletree.

No. 212,639.   Patented Feb. 25, 1879.

Witnesses:
F. M. Burnham
D. P. Cowl

Inventor:
Freeman R. Willson Sr
by
W. H. Babcock
Attorney

UNITED STATES PATENT OFFICE.

FREEMAN R. WILLSON, SR., OF COLUMBUS, OHIO.

IMPROVEMENT IN WHIFFLETREES.

Specification forming part of Letters Patent No. 212,639, dated February 25, 1879; application filed December 3, 1878.

*To all whom it may concern:*

Be it known that I, F. R. WILLSON, Sr., of Columbus, in the county of Franklin and State of Ohio, have invented certain new and useful Improvements in Whiffletrees; and do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to spring attachments for double-trees and single-trees of wagons; and consists in the construction, combination, and arrangement of parts, hereinafter particularly set forth.

Figure 1:
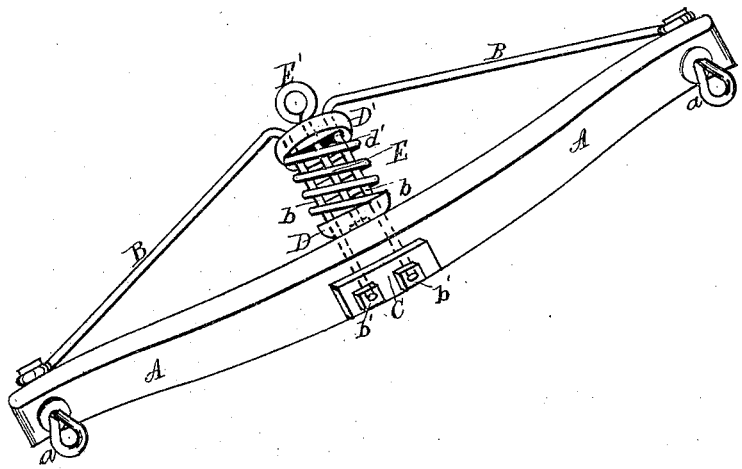
Figure 2:
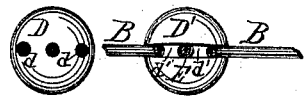

In the accompanying drawings, Figure 1 represents, in perspective, a whiffletree provided with my spring attachment; and Fig. 2 represents the latter, in detail, enlarged.

A designates the wooden part of a whiffletree to which my invention is applied, and which may be either a single-tree or a double-tree. At its ends are hooks or eyebolts $a\ a$, for the attachment of the traces or single-trees, as the case may be. Said eyebolts, or their equivalents, also serve to attach to said wooden part A, at the ends thereof, the outer ends of two bars, B B. These bars together form the draft-rod. They extend obliquely backward and toward each other, and are then bent so as to extend forward parallel to each other, passing through wooden part A, and being suitably held by nuts or washers $b'\ b'$ from withdrawal through the same. The form of these draft-rods may be considerably raised. A plate, C, on the front of the whiffletree shields the latter from wear.

The parallel parts $b\ b$ of the whiffletree leave a space between them, which is occupied by disks D D′ and interposed spring E. Front disk, D, is provided with two perforations, $d\ d$, whereby it is enabled to move backward over said bars, or allow the same to be drawn through it; and rear disk, D′, has a lateral slot, $d'$, which serves the same purpose. Said slot also allows the passage of the eyebolt E′, whereby said whiffletree is attached to the pole or the double-tree, according as it is a single-tree or double-tree.

Eyebolt E has its forward end attached to disk D. Thus the draft of the horse or horses on the whiffletree causes parallel parts $b\ b$ of bars B B to be drawn through said disk D, carrying with them disk D′, so as to compress the spring E between said disks. The resistance of said spring lessens the shock or jar in starting or on any sudden motion.

When my attachment is applied to double-trees, the construction of disk D′ with its lateral slot $d'$ becomes of great importance. It allows lateral play of the whiffletree over eyebolt E′, and thus prevents straining or binding in case the horses pull unevenly, as generally happens, and thus insures the proper action of the spring.

The draft-rods B B practically form, with the slotted disk, a continuous draft-rod, which also serves as a seat for the spring and a guide to hold the spring in position.

The parts are easily constructed, light, and readily detached for repairs.

The form of spring may be varied considerably, and the invention may be applied to a plow or cultivator as readily as to a vehicle.

The rods may be arranged outside of the spring instead of passing through it.

Having thus fully set forth my invention, what I claim as new, and desire to secure by Letters Patent, is—

The combination, in a whiffletree, of a wooden part, A, bars B B, forming the draft-rod, disks D D′, interposed spring E, and eyebolt E′, said disks being free to slide on said bars, and said disk D′ being laterally slotted at $d'$, substantially as and for the purpose set forth.

In testimony that I claim the foregoing as my own I affix my signature in presence of two witnesses.

FREEMAN R. WILLSON, SR.

Witnesses:
WM. L. ENGLAND,
JNO. W. COLLINS.